Jan. 10, 1961    E. G. FREEMAN    2,967,535
TRAILER AWNING SUPPORT STRUCTURE
Filed Sept. 25, 1957    3 Sheets-Sheet 1
FIG. 1
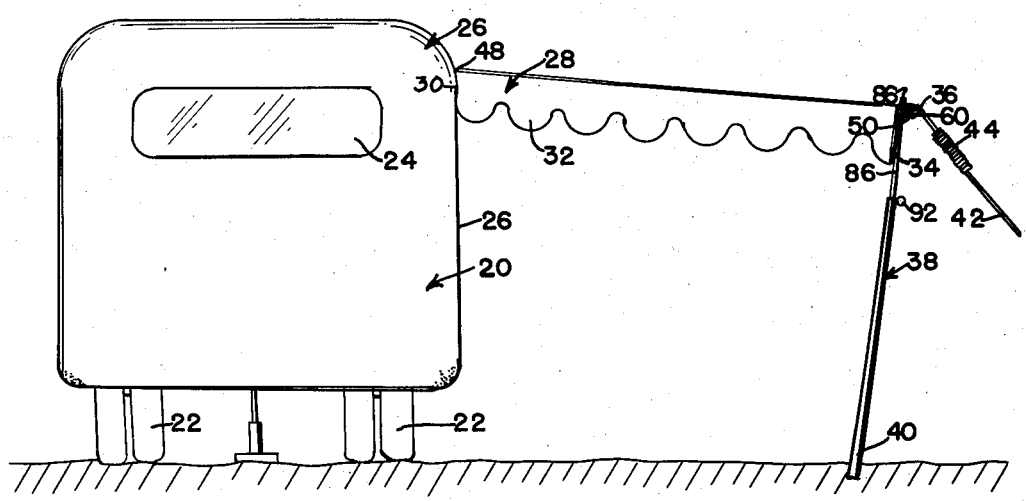
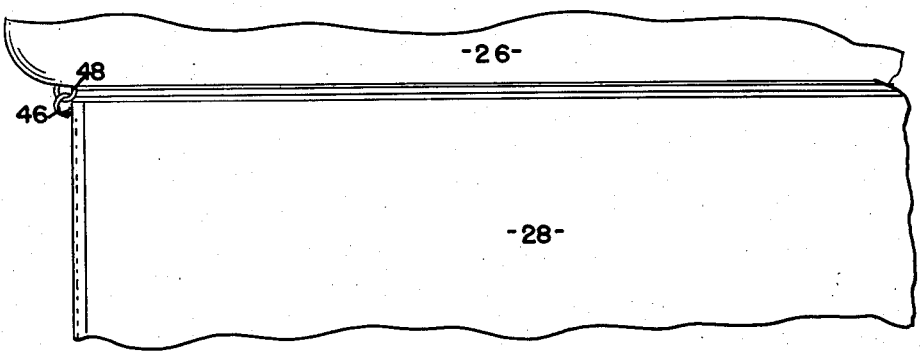
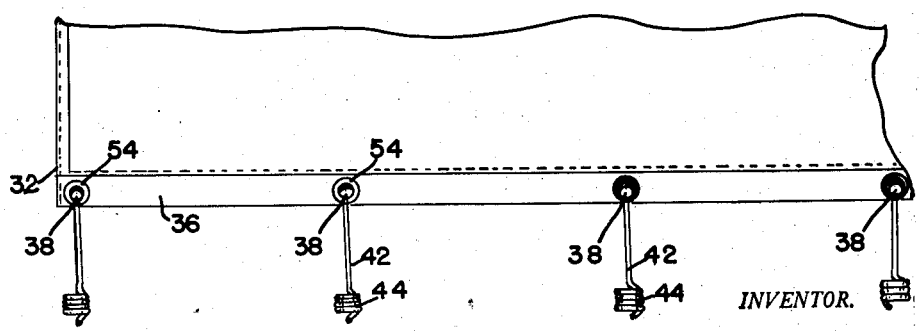
FIG. 2
INVENTOR.
ERNEST G. FREEMAN
BY
ATTORNEY Jan. 10, 1961  E. G. FREEMAN  2,967,535
TRAILER AWNING SUPPORT STRUCTURE
Filed Sept. 25, 1957  3 Sheets-Sheet 2

*INVENTOR.*
ERNEST G. FREEMAN
BY
ATTORNEY

Jan. 10, 1961   E. G. FREEMAN   2,967,535
TRAILER AWNING SUPPORT STRUCTURE
Filed Sept. 25, 1957   3 Sheets-Sheet 3

INVENTOR.
ERNEST G. FREEMAN
BY
ATTORNEY

United States Patent Office 2,967,535
Patented Jan. 10, 1961

---

2,967,535

TRAILER AWNING SUPPORT STRUCTURE

Ernest G. Freeman, 407 Newman Ave., East Point, Ga.

Filed Sept. 25, 1957, Ser. No. 686,119

9 Claims. (Cl. 135—5)

This invention relates to a trailer awning support structure and particularly to a collapsible support frame and awning formation arranged to support the awning above ground with some degree of flexibility in the outer edge thereof.

It is customary in certain situations to create a sheltered or shady place by means of a canvas awning attached at one side or edge to a rigid support, such as a trailer body, and supported at the other and outer edge by some means, such as tent-like poles, in the ground. This is quite common at trailer parks and permanent trailer locations and the awning with support is usually carried within the trailer until needed. Naturally such a device must be portable and collapsible to some degree and in addition must be easily set-up and strong enough after setting-up to support the awning in wind and rain.

Considerable difficulty has been encountered with various arrangements of beams and ropes and metal posts or pipe forming a framework for the awning. Some things are too awkward and bulky while others are too heavy and clumsy after setting up to withstand weather. The present invention provides a simple, lightweight structure attachable to a front edge pocket in the awning and has limited movement at regular intervals throughout the length for flexibility.

Generally described, without limitation on scope of invention the present arrangement is for use with and attachment on an awning having one side or edge thereof fastened by any means to a support, such as a trailer body, and extending outwardly therefrom over the ground with the front edge above ground, a pocket is formed in the front edge throughout the length thereof to receive the structural member inserted therein; and the front edge has holes therein, and a longitudinal structural member is inserted in said pocket along the front edge, said structural member being flexible and bendable at defined intervals therealong by means of joints or couplings comprising a central connector between coextensive lengths of structural member and having a through opening in said connectors for alignment with openings in said edge, and pivot pins connecting said central connector with said respective lengths of structural member in articulate manner. Support posts are inserted through each connector and through the corresponding opening in said awning edge with stop means on the posts to limit the insertion. With this arrangement, limited vertical movement may be had at each connector but no longitudinal movement occurs along the edge of the awning. Therefore, a desired amount of limited flexibility is attained.

A primary object of this invention is to support an awning from a trailer or the like with some flexibility at the outer edge while still holding the edge rigidly in place.

An additional object is to provide a structural member for insertion in an awning when in use and being detachable and foldable to some extent when not in use.

Another object is to provide a front edge support arrangement in a portable awning for attaching the support post and edge support into the awning edge with connectors permanently attached with the structural member.

One important feature is found in the support edge member itself and in the connectors placed at intervals thereon.

One embodiment of 40 ft. length structure of individual sections will fold into approximately a 60 inch space without detaching any parts; and there are no loose parts to catch in the awning structure.

An additional primary advantage of my invention is the provision of an elongated front support member which is flexible vertically at certain intervals but is rigid in a longitudinal direction.

Other and further objects and advantages of my invention will become apparent from the following specification taken in conjunction with the accompanying drawings, wherein:

Fig. 1 is a rear elevation view of a trailer with my awning supported therefrom.

Fig. 2 is a top plan view of the awning in Fig. 1 with portions thereof and of the trailer broken away.

Figure 3:
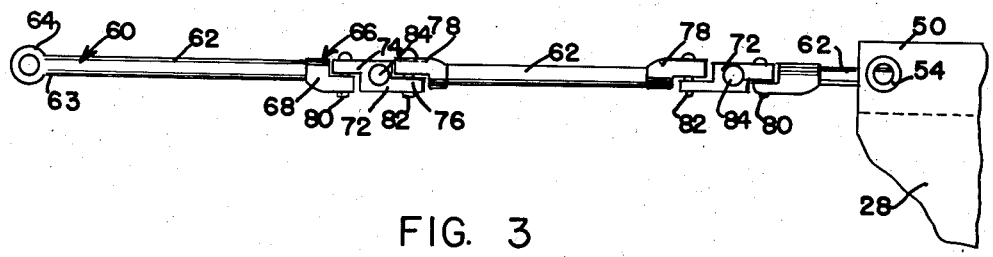
Figure 3 is a top plan view of the structural front edge support member of my invention being inserted in the pocket of the front edge of the awning.

Referring to Fig. 1, it is seen that a parked trailer 20 with tires 22 and rear window 24 has attached to one side 26 thereof an awning 28 with back attaching edge 30, scalloped side edges 32, a front edge 34 and a front attachment flap 36. Posts 38 with one end 40 inserted in the ground support the front edge 34 of awning 28 and are tensioned in place by a guy wire 42 with a flexible coil spring insert 44 allowing some adjustment in tension.

The back edge 30 attaches to the trailer body side 26 by any suitable means such as a rope 46 fitting on an eyelet 48 fixed on trailer side 26. The awning stretches and lies outwardly from the side 26 above the ground to form a canopy or covering thereover.

Figure 6:
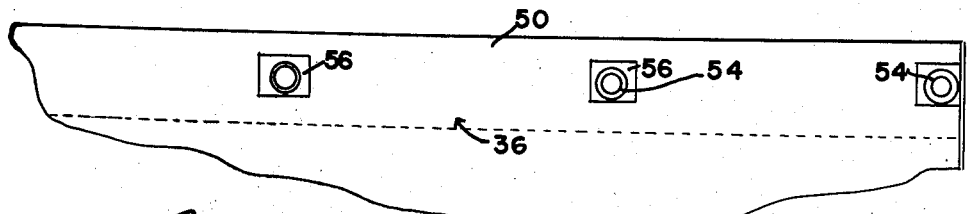
Fig. 6 is a bottom plan view of the bottom edge of the awning showing the support pocket therein.
Figure 7:
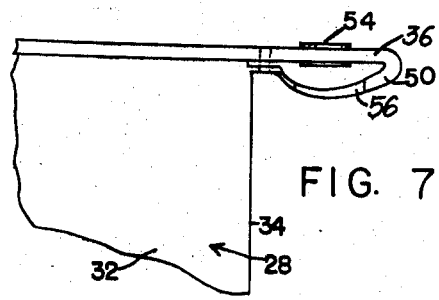
Fig. 7 is a side elevation view of a fragment of the awning edge of Fig. 6 showing the pocket therein.
Figure 8:
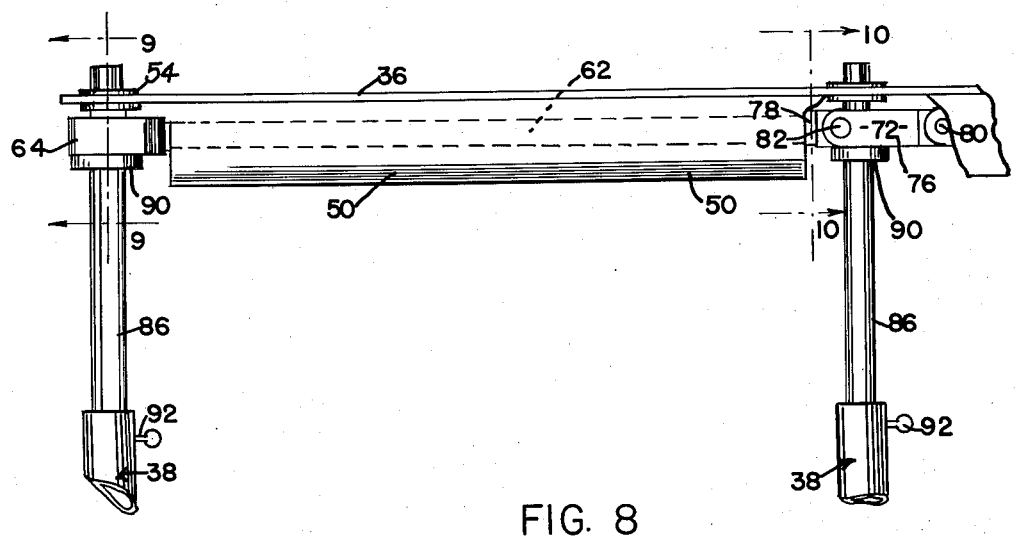
Fig. 8 is an enlarged front elevation view of the front awning edge with the support member and posts in position.
Figure 9:
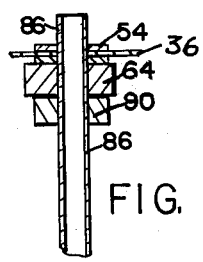
Fig. 9 is a cross-sectional view taken substantially along the line 9—9 in Fig. 8.
Figure 10:
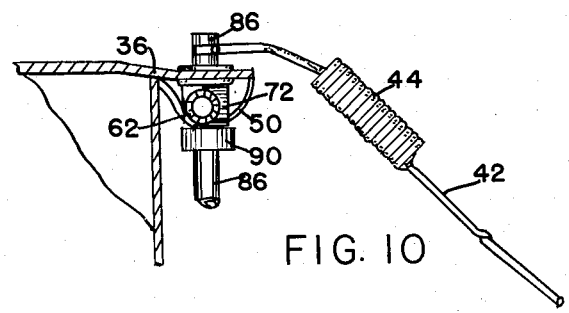
Fig. 10 is a cross-sectional view taken substantially along the line 10—10 in Fig. 8.
Figure 11:
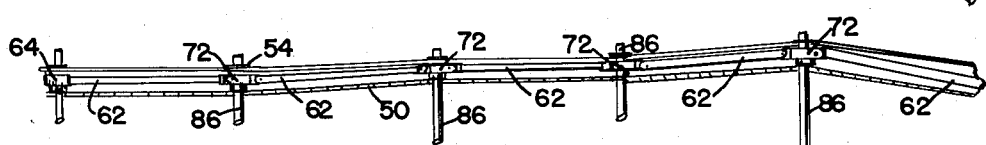
Fig. 11 is a front elevation view of the awning with the front edge broken away showing the support member in place with the bottom of the posts broken away.

Front edge 34 has attached thereto the front attachment flap 36 which has a longitudinal pocket 50 therealong at the bottom thereof (see Fig. 6). The top 52 of flap 30 has spaced at intervals therealong and attached thereto grommets or open rings 54 and the bottom of flap 30 is cut away and discontinuous at 56 beneath each respective grommet 54 forming pocket strips between grommets to expose same from the bottom. Through these cut-away or discontinuous openings 56 passes the upper end 58 of the pole or post 38 into and through the respective grommet 54. The pole also passes through one portion of a longitudinal structural member 60 inserted into the pocket 50.

Figure 4:
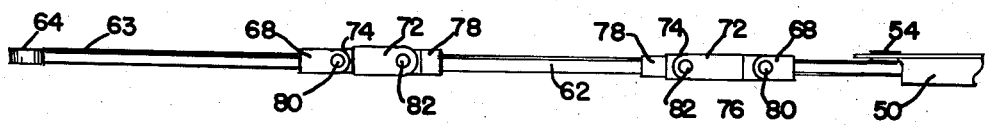
Fig. 4 is a front elevation view of the member of Fig. 3 being inserted in the pocket.
Figure 5:
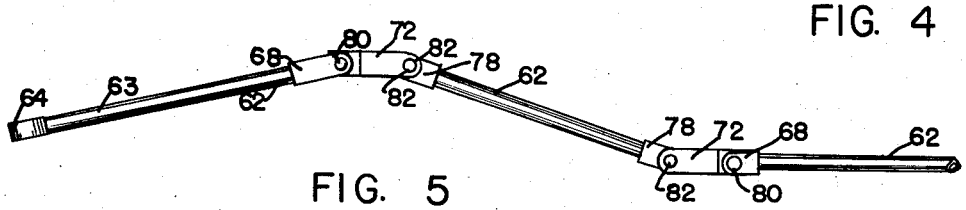
Fig. 5 is a front elevation view similar to Fig. 4 but with the support member adjusted.

Structural member 60, shown clearly in Figs. 3 through 5, and which is removable and foldable, runs substantially the entire length of the front edge inside of the pocket 50 to support the front edge above ground with some degree of flexibility and sufficient strength; and is inserted into pocket 50 from one end as shown in Figs. 3 and 4. The structural member 60 consists of a series of short lengths of individual rod or pipe or the like 62 and the terminal end length 63 on each terminal end has an open socket 64 while all intermediate lengths are joined by a coupling or joint 66 comprising a first, right-handed lug 68 rigidly attached on the end 70 of one length, a center connecting block 72 with flat protrusions 74, 76 jutting therefrom and a second, left-handed lug 78 rigidly connected to the next adjacent length. The protrusions 74, 76 are complementary with a respective lug 68, 78 and connected pivotally thereto by a pivot pin, respectively, 80, 82 so that the joint 66 is movable as links between adjacent lengths 62.

Figure 12:
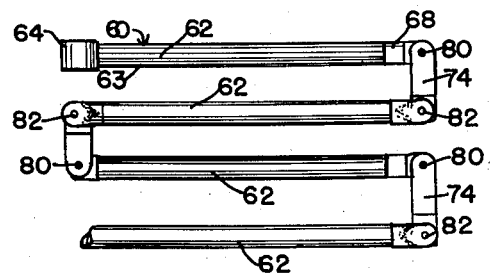
Fig. 12 is a plan view of the structural member of Figs. 3 and 4 folded for storage or transportation.

With the lengths connected by joint 66 and with the entire articulate, structural member 60 laid out lengthwise as when in position within the pocket 50, no longitudinal movement is possible although some limited vertical, articulate movement is possible when each length pivots about its respective pin 80, 82 which action is limited inside pocket 50 but can be used out of pocket 50 to permit folding in the manner of Fig. 12. Obviously there may be as many lengths joined together as required for the particular length of awning used, and folding of member 60 is readily accomplished.

Each center block 72 has drilled or otherwise formed therein a center hole 84 to receive the upper end 86 of the poles 38 therethrough. Lengths 62 are calculated and measured to correspond with the cut-out portions 56 in the bottom of flap 36 which in turn correspond with the top grommet 54. Therefore, the proper alignment of the structural member 60 inserted into pocket 50 places grommet 54 in vertical line with opening 56 with center hole 84 in block 72 in line between the two. With this arrangement, the post 38 upper end 86 is readily insertible through the block 72 and through and from the grommet 54. To secure the posts 38 through the block 72 with the awning 28 thereon, each upper end 86 of post 38 has fixed thereto a round collar member 90 which abuts the bottom of block 72 to keep the awning 28 and grommets 54 from slipping down on the post 38 and keeps the edge in engagement. Each post 38 is adjustable in height by the upper end 86 fitting telescopically into the bottom portion 40 and held adjustably in position therein by a wing-nut 92.

The structural member 60 with parts 62, open socket 64, coupling 66 with its block 72 and lugs 68, 78 presents a smooth longitudinal support that is easily inserted and removed from pocket 50 without snagging, clamping or otherwise impeding operation. In addition, as is readily seen in Figs. 5 and 12, the structural member 60 is readily foldable about the couplings 66 to a position in Fig. 12 where the individual members 62 are in spaced opposition and the lengthy member 60 is reduced to a compact form. This is of great value in transporting the device. Furthermore, there are no protruding parts from the front edge of the awning 28 and everything is concealed neatly beneath the front edge 34.

While I have shown and described a particular form of my awning along with specific construction of parts for the various elements, this is not to be construed as any sort of limitation on scope of my invention since various eliminations, substitutions, alterations, modifications, and changes may be made in the particular embodiment shown and described without departing from the scope of the appended claims.

I claim:

1. In an awning structure of the class described to be supported from a fixed base such as a trailer and having a flexible awning extending outwardly therefrom above the ground, a front edge on said awning supported above the ground and extending longitudinally therealong, a plurality of support posts each having an upper end engageable with and inserted through said awning front edge to support same above ground, a longitudinal structural member supported on said posts and positioned along the front edge of said awning and supporting same, said longitudinal member being composed of a plurality of individual, rigid members permanently connected together, a joint connecting adjacent pairs of said rigid members and having an opening formed therein to receive a respective post therein and therethrough out of said front edge, retaining means on said post retaining said post in engagement with said respective joints, said individual longitudinally diposed, connected members being fixed against longitudinal displacement and against movement in a longitudinal direction by connection through said joints, said longitudinal individual members being movable in an arcuate direction about a respective joint and along said edge thereby positioning one of said individual members in a different angle than another, whereby said front edge will adjust vertically therealong but is immovable in a longitudinal direction.

2. The device in claim 1 wherein said longitudinal member is foldable for storage by virtue of said individual members rotating about their respective joints to a position placing them in opposed, spaced relation, whereby said longitudinal member can be removed from said edge and folded and transported within a minimum of space.

3. In an awning structure of the class described to be supported from a fixed base such as a trailer and having a flexible awning extending outwardly above the ground, a front edge on said awning having a plurality of spaced openings therein arranged at intervals along the length of said edge, a plurality of support posts supported on the ground and each having an upper end insertible through said openings in said edge, a means retaining said edge on said posts, an elongated structural support member positioned on and removable from said front edge and said posts with the length thereof following generally the contour of the front edge, said support member being formed by a plurality of lengths of individual members permanently connected together in longitudinal alignment by means of hinge pins, said individual members being movable about said hinge pins for rotational displacement and being fixed by said hinge pins from longitudinal displacement whereby said support member cannot change length but can change vertical position at each individual member, and said structural support member being removable for storage or transportation of said awning and being foldable about said respective hinge pins to bring said individual members into spaced, opposed relationship whereby the length of said structural member is substantially reduced for compactness.

4. In an awning structure of the class described to be supported from a fixed base such as a trailer and having a flexible awning extending outwardly therefrom above the ground, a front edge on said awning having a plurality of spaced openings therein arranged at intervals along the length of said edge, a plurality of support posts supported on the ground and each having an upper end insertible through said openings in said edge, a means retaining said edge in engagement with said posts, a pocket on said front edge having portions thereof discontinuous about said openings in said edge, an elongated structural support member positioned in and removable from said front edge pocket and having portions thereof in alignment with said edge openings, the length of said structural support member following generally the contour of the front edge of said awning, said support member being formed articulately by a plurality of lengths of individual members connected together respectively by a hinged coupling joint including a center block between said adjacent individual members, said block member having a center hole therein through which a post passes, said centre hole being in alignment with a respective discontinuous portion of said pocket and with a respective opening in said front edge whereby a post will pass freely therethrough, said individual members being movable about said hinge joint for rotational, articulate movement in a limited vertical direction but being fixed by said hinge joint from longitudinal displacement whereby said awning edge and support member cannot change substantially the length thereof and can vary vertical position at each individual member, and said structural support member being removable and foldable with said individual members connected.

5. In an awning structure of the class described for supporting from a fixed base such as a trailer and having a flexible awning extending outwardly therefrom above the ground, a front edge on said awning having a plurality of spaced openings therein arranged at intervals along the length of said edge, a plurality of support ports supported on the ground and each having an upper end insertible through said openings in said edge, a means retaining said edge in engagement with said posts, an elongated structural support member positioned on and removable from said front edge and having portions thereof in alignment with said edge openings, the length of said structural support member following generally the contour of the front edge of said awning, said support member being formed articulately by a plurality of lengths of individual members connected together respectively by a hinged coupling consisting of a center block between said adjacent individual members, a connecting portion on each one of each of said adjacent individual members, and a pivot pin connecting each respective connecting portion with a respective end of said block member, said block member having a center hole therein through which a post passes, said center hole being in alignment with a respective portion of said edge and with a respective opening in said front edge whereby a post will pass freely therethrough, said individual members being movable about said hinge pins for rotational, arcticulate movement in a limited vertical direction but being fixed by said hinge pins from longitudinal displacement whereby said awning edge and support member cannot change substantially the length thereof and can vary the vertical position at each individual member, and said structural support member being removable and foldable with said individual members connected.

6. In an awning structure of the class described to be supported from a fixed base such as a trailer and having a flexible awning extending outwarly therefrom above the ground, a front edge on said awning having a plurality of spaced openings therein arranged at intervals along the length of said edge, a plurality of support posts supported on the ground and each having an upper end insertible through said openings in said edge, a means retaining said edge in engagement with said posts, a pocket on said front edge having portions thereof discontinuous about said openings in said edge, an elongated structural support member positioned in and removable from said front edge pocket and having portions thereof in alignment with said edge openings, the length of said structural support member following generally the contour of the front edge of said awning, said support member being formed articulately by a plurality of lengths of individual members connected together respectively by a hinged coupling consisting of a center block between said adjacent individual members, a connecting portion on each end of each of said adjacent individual members, and a pivot pin connecting each respective connecting portion with a respective end of said block, said block having a center hole therein through which a post passes, said center hole being in alignment with a respective discontinuous portion of said pocket and with a respective opening in said front edge whereby a post will pass freely therethrough, said individual members being movable about said hinge pins for rotational articulate movement in a limited vertical direction but being fixed by said hinge pins from longitudinal displacement whereby said awning edge and support member cannot change substantially the length thereof and can vary the vertical position at each individual member, and said structural support member being removable and foldable with said individual members connected.

7. In an awning structure of the class described to be supported from a fixed base such as a trailer and having a flexible awning extending outwardly therefrom above the ground, a front edge on said awning having a plurality of connecting portions therein arranged at intervals along the length of said edge, a plurality of support posts supported on the ground and each having an upper end engageable with a connecting portion on said edge, a means retaining said edge in engagement with said posts, a pocket on said front edge having portions thereof discontinuous about said connecting portions in said edge, an elongated structural support member positioned in and removable from said front edge pocket and having portions thereof in alignment with said edge connecting portions, the length of said structural support member following generally the contour of the front edge of said awning, said support member being formed articulately by a plurality of lengths of individual members connected together respectively by a hinged coupling consisting of a center block between said adjacent individual members, a connection on each end of each of said adjacent individual members, and a pivot pin connecting each respective connection with a respective end of said block, said block being engageable with a respective part at said connecting portion of said awning, said block being in alignment with a respective discontinuous portion of said pocket and with a respective connecting portion on said front edge whereby a post will pass through said pocket freely, said individual members being movable about said hinge pins for rotational, articulate movement in a limited vertical direction but being fixed by said hinge pins from longitudinal displacement whereby said awning edge and support member cannot change substantially the length thereof and can vary the vertical position at each individual member, and said structural support member being removable and foldable with said individual members connected.

8. In an awning structure of the class described for supporting from a fixed base such as a trailer and having a flexible awning extending outwardly therefrom above the ground, a front edge on said awning having a plurality of spaced openings therein arranged at intervals along the length of said edge, a plurality of support posts supported on the ground and each having an upper end insertible in said openings in said edge to engage said post therewith, a means retaining said post in insertion engagement with said edge, an elongated structural support member positioned on and removable from said front edge and having portions thereof in alignment with said edge openings, the length of said structural support member following generally the contour of the front edge of said awning, said support member being formed articulately by a plurality of lengths of individual members connected together respectively by a hinged coupling coupled in fixed longitudinal engagement with and between each adjacent and respective pair of individual members, said coupling having a hole formed therein through which the upper end of a respective post is positioned, said hole being positioned in alignment with a respective edge opening in said awning edge whereby a post will pass freely through said coupling and into said front edge opening thereby supporting said coupling on said post which in turn engages the edge of said awning with said longitudinal support member supporting said edge longitudinally, said individual members in said elongated structural support member being movable articulately and arcuately about a fixed point for limited vertical movement to allow said front edge to rise or drop but said individual members being fixed from longitudinal movement whereby said awning edge and said longitudinal support member cannot change substantially in length but permit limited vertical rise and fall of said awning edge, whereby said awning edge is made partially rigid with limited vertical adjustment for contour and the like.

9. The device of claim 8 wherein said support member is removable from said front edge and said support member is foldable without disengagement for storage purposes.

References Cited in the file of this patent
UNITED STATES PATENTS

| | | |
|---|---|---|
| 1,344,717 | Puff | June 29, 1920 |
| 1,449,894 | Dial | Mar. 27, 1923 |
| 2,573,060 | Rauglas | Oct. 30, 1951 |
| 2,720,885 | Legg | Oct. 18, 1955 |
| 2,788,791 | Pospisil et al. | Apr. 16, 1957 |